(12) United States Patent
Colantonio et al.

(10) Patent No.: US 12,202,128 B1
(45) Date of Patent: Jan. 21, 2025

(54) ROBOTIC PICKING ASSEMBLIES WITH HIGHLY DAMPED SUCTION CUPS

(71) Applicant: Amazon Technologies, Inc., Seattle, WA (US)

(72) Inventors: Peter Thomas Colantonio, Andover, MA (US); Benjamin Bedard, Revere, MA (US)

(73) Assignee: Amazon Technologies, Inc., Seattle, WA (US)

( * ) Notice: Subject to any disclaimer, the term of this patent is extended or adjusted under 35 U.S.C. 154(b) by 691 days.

(21) Appl. No.: 17/474,593

(22) Filed: Sep. 14, 2021

(51) Int. Cl.
*B25J 15/06* (2006.01)
*B25J 19/00* (2006.01)
*F16F 15/023* (2006.01)

(52) U.S. Cl.
CPC ....... *B25J 15/0683* (2013.01); *B25J 19/0091* (2013.01); *F16F 15/023* (2013.01); *F16F 2222/12* (2013.01); *F16F 2230/36* (2013.01); *F16F 2232/08* (2013.01)

(58) Field of Classification Search
CPC .. B25J 15/0683; B25J 19/0091; F16F 15/023; F16F 2222/12; F16F 2230/36; F16F 2232/08
See application file for complete search history.

(56) References Cited

U.S. PATENT DOCUMENTS

| | | | |
|---|---|---|---|
| 10,875,194 B1* | 12/2020 | Coleman | B25J 15/0683 |
| 10,926,403 B1* | 2/2021 | Asokan | B25J 15/0052 |
| 2020/0189122 A1* | 6/2020 | Polido | B25B 11/005 |
| 2020/0269443 A1* | 8/2020 | Billon | B65G 47/91 |
| 2021/0095642 A1* | 4/2021 | Cieslak | B62D 57/024 |
| 2021/0170550 A1* | 6/2021 | Hoehn | B25B 11/005 |

* cited by examiner

*Primary Examiner* — Stephen A Vu
(74) *Attorney, Agent, or Firm* — Eversheds Sutherland (US) LLP

(57) ABSTRACT

Systems and methods are disclosed for robotic picking assemblies with highly damped suction cups. In one embodiment, an example suction cup for a picking assembly may include a shell formed of an elastomeric material, where the shell forms a first bellow. The suction cup may include a first fluid chamber disposed on an outer portion of the suction cup, a first opening, where fluid from the first fluid chamber passes through the first opening, and an optional second fluid chamber disposed on an inner portion of the suction cup. The suction cup may include an optional second opening formed in the shell, where fluid from the second fluid chamber passes through the second opening. The first fluid chamber and the second fluid chamber may be configured to dampen movement of the suction cup.

19 Claims, 10 Drawing Sheets

ROBOTIC PICKING ASSEMBLIES WITH HIGHLY DAMPED SUCTION CUPS

BACKGROUND

As users increasingly make online purchases, fulfilment of such purchases and other orders may become increasingly complicated. For example, a fulfillment center may have output of upwards of one million packages per day. With such demands, efficiency of logistics related to processing orders and packages may be important. Accordingly, improvements in various operations of order fulfillment, such as improvements to picking technology, sorting technology, packing technology, and so forth may be desired, such that manual efforts can be redirected to different tasks.

Figure 1:
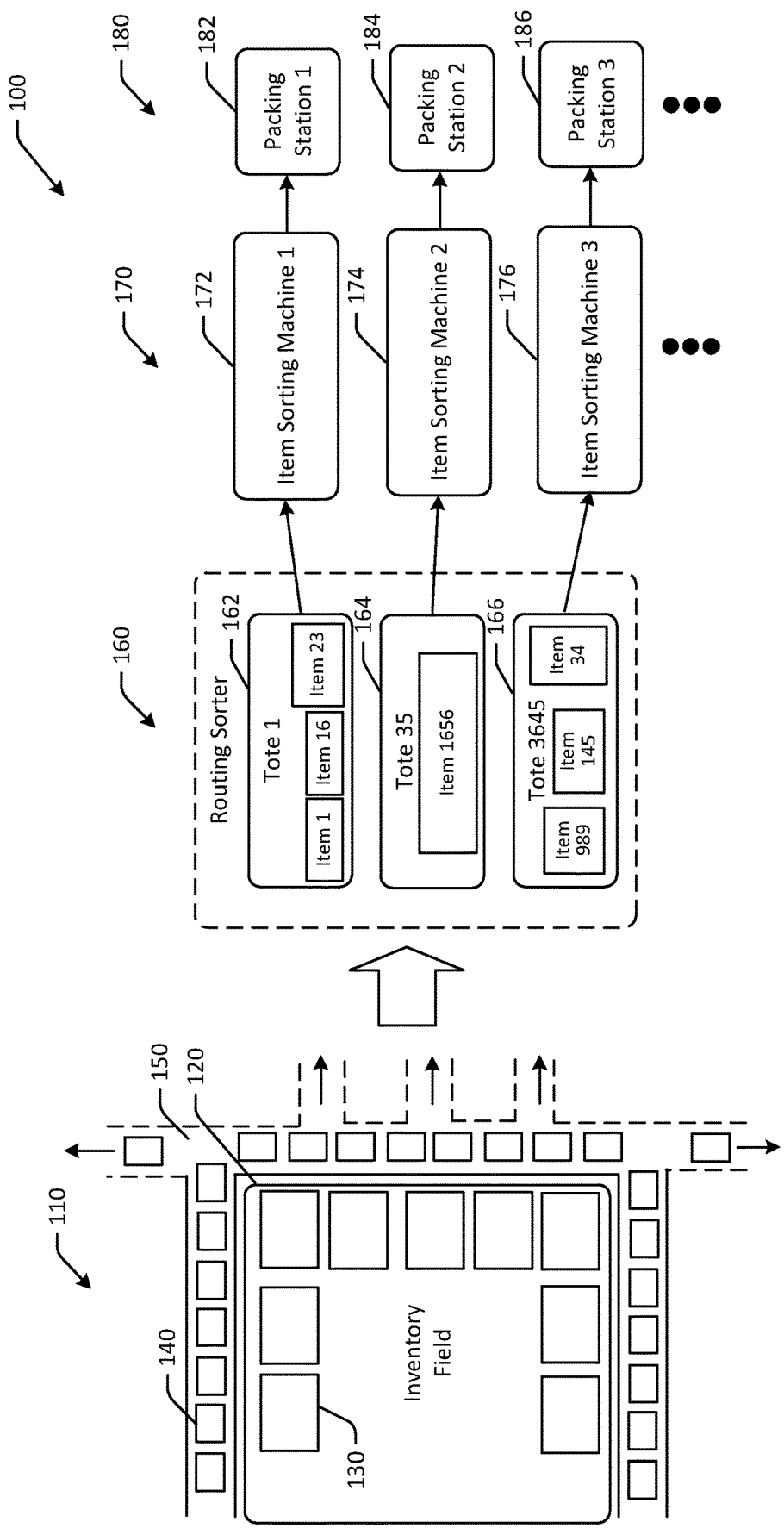
FIG. 1 is a hybrid schematic illustration of an example use case for robotic picking assemblies with highly damped suction cups and an example process flow in accordance with one or more embodiments of the disclosure.

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. The use of the same reference numerals indicates similar, but not necessarily the same or identical components. Different reference numerals may be used to identify similar components. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Fulfillment centers may be used to fulfill online purchases and other orders. For example, fulfillment centers may include product inventory that may be pulled when an order for a particular product or multiple products is placed. In some instances, the product(s) may be packed and shipped from the fulfillment center. However, the process of obtaining the product(s), packing the product(s), and shipping the product(s) may be complicated due to the amount of inventory, the number of orders to process, the size of the fulfillment center, and/or other factors. In addition, a portion of the fulfillment center designated for packing or shipping may be different than the portion of the fulfillment center designated for holding product inventory. As a result, transportation of products in an order may be time consuming.

Moving items or objects through a fulfillment center may require handling of the item itself. For example, picking the item from inventory, placing the item into a container, removing the item from a container, and so forth may all be examples of actions for which an item may need to be handled. In addition, different items may have different types of packaging. For example, some items may come in boxes, some items may come in loose bags, some items may come shrink wrapped, some items may not have any packaging, and so forth. In addition, retrieving a certain number of items, such as singular items, or multiple items in cluttered environments (e.g., stacked on top of each other or otherwise in a number of layers, etc.), may be difficult, and may depend on a type of packaging in which the item comes with. Humans may be able to manually handle individual items with ease. However, robotic handling of items may require various levels of dexterity. In addition, using a robot or other machine to grasp an item in a cluttered environment, such as a box or tote with multiple items inside, may be difficult to achieve reliably using mechanical systems.

In addition, when grasping large and/or heavy items, such as large packages or boxes, the items may be susceptible to dropping or otherwise coming detached from suction cups or other end of arm tools coupled to robotic manipulators. For example, if the robotic manipulator moves the item with too much acceleration, the item may not be securely grasped by a suction cup assembly, and may become detached and/or fall from the suction cup assembly. The item may then need to be re-grasped and/or manually handled, causing delays in processing. To avoid such issues, acceleration and/or speed of robotic manipulators may be limited, which results in a potential bottleneck in processing of such items. However, although reducing speed and/or acceleration of robotic manipulators may reduce a risk of an item coming loose or falling, an appropriate speed or acceleration may be difficult to determine and may not be applicable to all sizes, shapes, and/or weights of large items.

Embodiments of the disclosure include suction cup assemblies, which may be used in conjunction with end of arm tools and/or robotic manipulators, such as robotic arms, to grasp and move large and/or heavy items with increased acceleration, and while reducing a risk that a grasped item will detach from the suction cup(s). Some embodiments include individual suction cups that have increased damping ratios relative to typical suction cups. For example, certain embodiments may have suction cup damping ratios of at least 0.3 to about 1.5. Some embodiments may have damping ratios of about 0.7. Relative to typical suction cup damping ratios of 0.1, embodiments of the disclosure may reduce force amplification that occurs when moving objects that are attached to the suction cup. Some embodiments increase damping ratios by including two or more materials in different discrete layers of the suction cup (e.g., via over-molding, etc.), whereas other embodiments include various mechanical fluid-based features (e.g., using metered air or fluid filled volumes that shuttle fluid across a restriction to provide damping, etc.) to increase damping. As a result, force amplification is reduced, and larger and/or heavier packages can be handled at relatively higher acceleration. Some embodiments can therefore increase speed of consolidating products in a multi-item order. As a result, throughput of fulfillment centers may be improved, and/or logistics of fulfillment center operations may be less complicated.

Referring to FIG. 1, an example use case 100 for robotic picking assemblies with highly damped suction cups and an example process flow in accordance with one or more embodiments of the disclosure. Although discussed in the context of online orders, other embodiments may be directed to any suitable use case where objects are picked and released, such as instances where objects are picked from inventory, placed into containers, removed from containers for sorting, and so forth.

In FIG. 1, a fulfillment center may include an inventory field 110, a routing sorter 160, one or more item sorting machines 170, and one or more packing stations 180. The inventory field 110 may be include a storage platform, or a portion of the fulfillment center at which products picked from product inventory are placed. Robots may be used to pick products from inventory and to deliver to the robotic storage platform in some instances, while in other instances, manual labor or a combination thereof may be used to pick products. For example, robotic picking assemblies with highly damped suction cups may be used to pick objects from inventory containers and to place the retrieved objects into containers. The picking process at the robotic storage platform may include locating a product in an order, obtaining the product, and sending the product to a robotic storage platform, such as via a conveyor belt. In the illustrated embodiment, products at the robotic storage platform may be placed in a container, such as a tote.

The inventory field 110 may include multiple items that are in inventory. The items may be used to fulfill orders. The inventory field 110 may be a robotic field in some instances. One or more picking stations 130 may be positioned along a perimeter 120 of the inventory field 110. The picking stations 130 may be manually operated or may include robotic components, or a combination thereof. In some instances, picking of items from the inventory field 110 may be completed by robots that include robotic picking assemblies with highly damped suction cups, where the items are delivered to the picking stations 130 after being retrieved from the inventory field 110. Any number of picking stations 130 may be included, and the picking stations 130 may be located in a different position than that illustrated in FIG. 1.

One or more conveyors 150 may be disposed about the inventory field 110. For example, conveyors 150 may be disposed along the perimeter 120 of the inventory field 110. The conveyors 150 may run adjacent to the picking stations 130 in some embodiments. Any suitable conveyor configuration may be used. In the illustrated example, the conveyors 150 may include belts or rollers that run alongside the picking stations 130 and include one or more paths to one or more routing sorters.

The conveyors 150 may be used to transport one or more totes 140. For example, as totes 140 move along the conveyors 150, items may be moved from the picking stations 130 into respective totes 140. The totes 140 may be associated with particular item sorting machines, and may be moved using the conveyors 150 to a routing sorter 160.

The routing sorter 160 may be configured to route, divert, or otherwise guide certain totes to an item sorting machine. The routing sorter 160 may include any combination of ramps, slides, rollers, arms, guides, and/or other components to route totes to a particular item sorting machine. At the routing sorter 160, totes including products that have been picked may be routed to the appropriate or designated item sorting machine. For example, the routing sorter 160 may determine an identifier associated with the tote, and may determine an item sorting machine associated with the tote using the identifier. The routing sorter 160 may route or direct the tote to the appropriate item sorting machine.

A number of item sorting machines 170 may be coupled to the routing sorter 160. For example, a first item sorting machine 172, a second item sorting machine 174, a third item sorting machine 176, and so forth may be coupled to the routing sorter 160. The routing sorter 160 may guide totes to the item sorting machines to which they are assigned. For example, a first tote 162 may include item 1, item 16, and item 23, and may be assigned to the first item sorting machine 172. The routing sorter 160 may therefore route the first tote 162 to the first item sorting machine 172 for sortation of the respective items. A second tote 164 may include item 1656, and may be assigned to the second item sorting machine 174. The routing sorter 160 may therefore route the second tote 164 to the second item sorting machine 174 for sortation of the item. A third tote 166 may include item 989, item 145, and item 34, and may be assigned to the third item sorting machine 176. The routing sorter 160 may therefore route the third tote 166 to the third item sorting machine 176 for sortation of the respective items.

Some or all of the item sorting machines may be associated with one or more packing stations 180 that may be used to pack items into a shipment when a single-item or multi-item order is complete. For example, the first item sorting machine 172 may be coupled to a first packing station 182, the second item sorting machine 174 may be coupled to a second packing station 184, the third item sorting machine 176 may be coupled to a third packing station 186, and so forth. The item sorting machines may be configured to receive items from totes that have one or more, or multiple, items. The number of totes and/or the number of items associated with respective item sorting machines may be balanced, and multiple totes may be routed to the first item sorting machine 172 and the second item sorting machine 174 at the same time.

At any of the stages of the example fulfillment process of FIG. 1 where handling of objects is used, such as to pick items from inventory, place items in totes, remove items from totes, place items into bins, remove items from bins, place items into boxes for shipping, handling packed boxes and/or packages, and so forth, robotic picking assemblies with highly damped suction cups as described herein may be used. As a result, manual effort can be redirected to other tasks.

Embodiments of the disclosure include robotic picking assemblies with highly damped suction cups. Certain embodiments may improve processing speed and/or throughput of fulfillment centers. Certain embodiments may improve performance of mechanical equipment for sortation and/or consolidation of items. While described in the context of online orders, aspects of this disclosure are more broadly applicable to other forms of object handling.

Unlike other suction-based grippers, the robotic picking assemblies with highly damped suction cups described herein may retain grasp on heavy and/or large items, and may provide control over items that have been grasped during acceleration, with repeatable performance.

Example embodiments of the disclosure provide a number of technical features or technical effects. For example, in accordance with example embodiments of the disclosure, certain embodiments of the disclosure may improve processing speed, throughput, and/or efficiency of fulfillment centers. The above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of the embodiments disclosed herein are also within the scope of this disclosure. The above-described embodiments and additional and/or alternative embodiments of the disclosure will be described in detail hereinafter through reference to the accompanying drawings.

Illustrative Embodiments and Use Cases

Figure 2A:
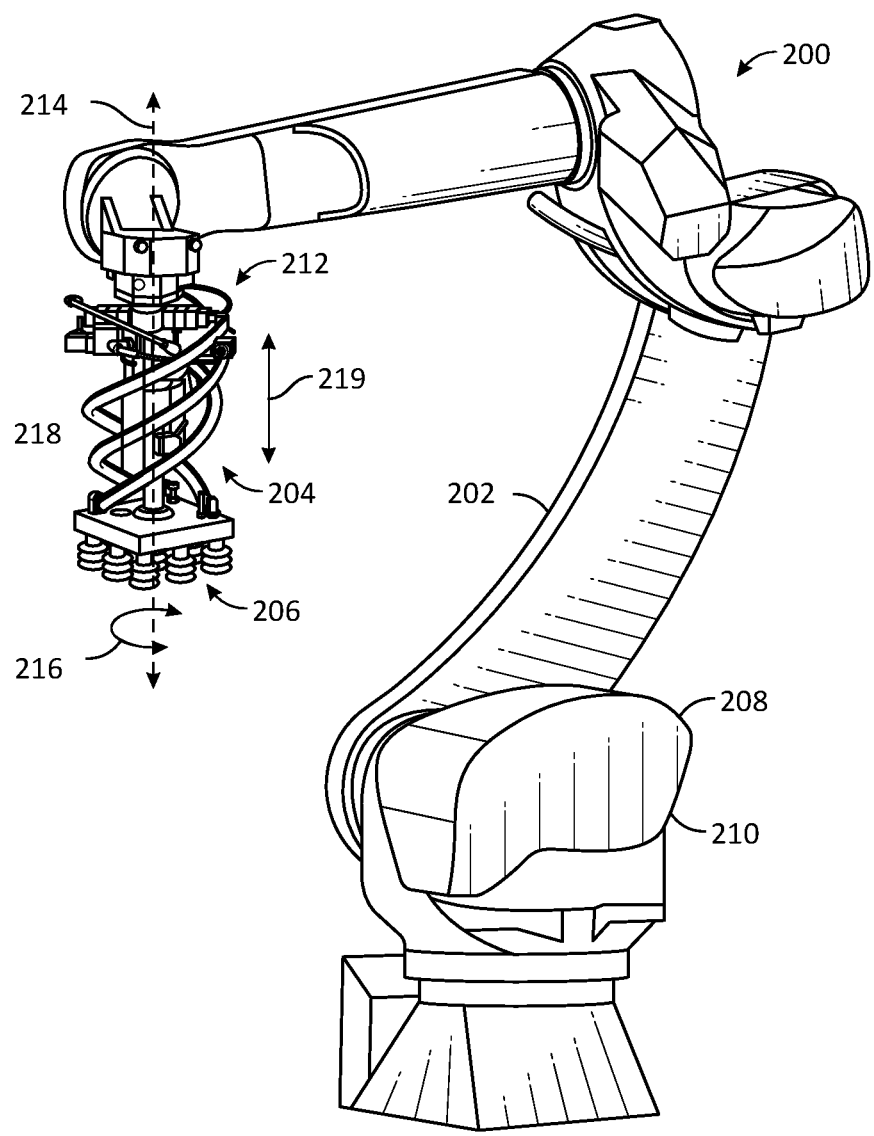
FIGS. 2A-2B are schematic illustrations of an example robotic picking assembly and an example use case for grasping a large item using highly damped suction cups in accordance with one or more embodiments of the disclosure.
Figure 2B:
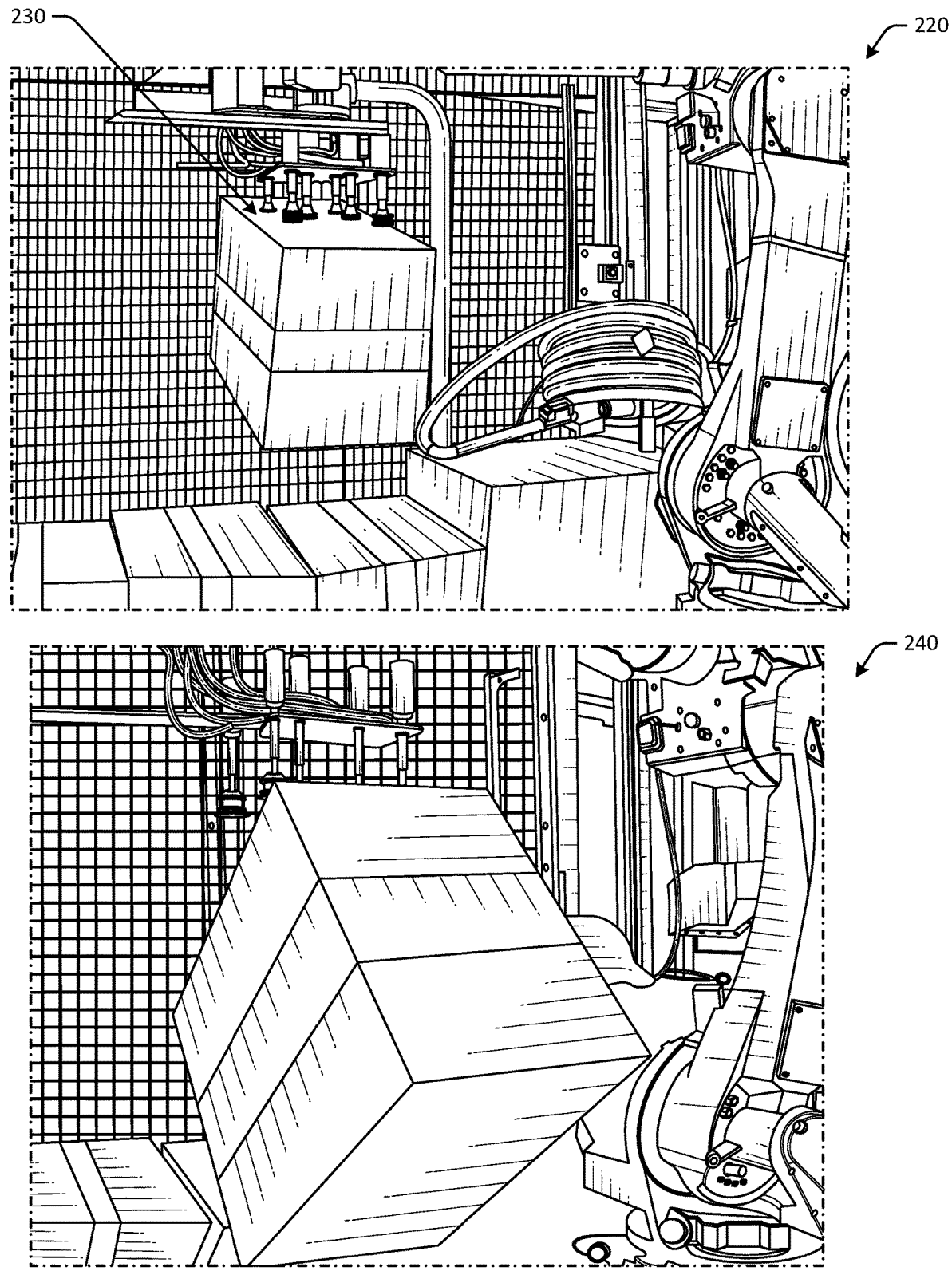

FIGS. 2A-2B are schematic illustrations of an example robotic picking assembly 200 and an example use case for grasping a large item using highly damped suction cups in accordance with one or more embodiments of the disclosure. Other embodiments may include additional or fewer components. The illustration of FIGS. 2A-2B may not be to scale, and may not be illustrated to scale with respect to other figures. The robotic picking assembly illustrated in FIGS. 2A-2B may be the same picking assembly discussed with respect to FIG. 1.

In FIG. 2A, the robotic picking assembly 200 may be an item manipulation system including a robotic manipulator 202 and a picking assembly or end of arm tool 204 having a suction manifold 206 including asymmetrical independently controllable suction zones, according to at least one example. The suction manifold 206 may include one or more highly damped suction cups as described herein. The robotic picking assembly 200 also includes a management device 208 and a vacuum pump 210 (e.g., any suitable pump cable of producing a negative pressure at the suction manifold 206). While illustrated in FIG. 2 as being integrated with the robotic manipulator 202, the management device 208 and the vacuum pump 210 may also be located remote from the robotic manipulator 202. For example, the management device 208 may form part of a computer station at which the system 200 is implemented or may be located at a different facility altogether (e.g., control signals may be passed over a network connection). In some examples, the vacuum pump 210 may be shared among more than one robotic manipulator 202 (e.g., a single vacuum pump 210 may provide suction for multiple robotic manipulators 202).

The robotic manipulator 202 may be any suitable material handling robot (e.g., Cartesian robot, cylindrical robot, spherical robot, articulated robot, parallel robot, SCARA robot, anthropomorphic robot, any other suitable robotic manipulator and/or robotic arm, automated guided vehicles including lift capabilities, vertical lift modules, gantries, overhead lift modules, and any other suitable material handling equipment that interacts with or otherwise handles objects) that is operable by the management device 208 (e.g., a computing device or other electronic controller).

The robotic manipulator 202 may include any suitable type and number of sensors disposed throughout the robotic manipulator 202 (e.g., sensors in the base, in the arm, in joints in the arm, in an end effector, or in any other suitable location). The sensors can include sensors configured to detect pressure, force, weight, light, objects, slippage, and any other information that may be used to control and/or monitor the operation of the robotic manipulator 202, including the end of arm tool 204. The sensors may include any suitable combination of sensors capable of detecting depth of objects, capturing RGB and other images of objects, scanning machine-readable information, capturing thermal images, detecting position and orientation of objects, and performing any other suitable sensing as described herein.

The end of arm tool 204 can include a rotational joint 212 that enables rotation of a substantial part of the end of arm tool 204 about a tool axis 214, as illustrated by rotational arrows 216. The tool axis 214 is defined as extending axially through a center of the end of arm tool 204. This rotational capability of the end of arm tool 204 enables precise positioning of the suction manifold 206 with respect to a target area of an item. For example, the end of arm tool 204 may be rotatable at least 300 degrees and, in some examples, a full 360 degrees of rotation may be achieved. As the end of arm tool 204 may be rotated in a clockwise and counterclockwise direction, and when combined with the other degrees of freedom of the robotic manipulator 202, the suction manifold 206 may be oriented in almost any suitable rotational orientation. As described herein, rotation of the end of arm tool 204 may be represented as the number of degrees of rotation, which may include a total combined number of degrees in two directions (e.g., 180 degrees of rotation can mean 90 degrees of counterclockwise rotation and 90 degrees of clockwise rotation) or the total number of degrees in one direction (e.g., 180 degrees of rotation can mean 180 degrees of counterclockwise rotation and 180 degrees of clockwise rotation). In some examples, the end of arm tool 204 may provide for infinite degrees of rotation, e.g., the end of arm tool 204 may freely rotate through multiple revolutions in one or both directions.

The picking assembly or end of arm tool 204 can also include the suction manifold 206. The suction manifold 206 includes multiple asymmetrical independently controllable suction zones. Depending on characteristics of a target item, different zones may be turned on and turned off to increase the probability that the target item is picked successfully and adjacent items are left behind. This enables the robotic picking assembly 200 to successfully and efficiently singulate items from a set of items (e.g., a pile items of varying shapes, sizes, and surface properties).

The end of arm tool may also include a compliance mechanism 218. The compliance mechanism 218, which is connected to the suction manifold 206, is configured to provide compliance to the suction manifold 206. In particular, the compliance mechanism 218, which includes one or more springs or other biasing device(s), controls translation of the suction manifold 206 along the tool axis 214, e.g., in the directions indicated by translation arrows 219.

The management device 208 may be configured to manage the operation of the robotic manipulator 202 (e.g., moving the robotic manipulator through different poses and orientations to position the end of arm tool 204), manage operation of the vacuum pump 210 (e.g., turning on and off the pump, adjusting suction levels, etc.), manage the operation of the end of arm tool 204 (e.g., rotating the end of arm tool 204 to align suction zone(s) of the suction manifold 206 with an item), and manage operation of the suction manifold 206 (e.g., opening and closing valves to selectively apply suction in different suction zones of the suction manifold 206). In some examples, the management device 208 may be distributed at one or more locations. For example, a first management device 208 may be local to the robotic manipulator 202 and include hardware and firmware and a second management device 208 may be remote from the robotic manipulator 202 and include software. The management device 208 may include any suitable combination of software, firmware, processors, memory devices, specialized chips, sensors, and the like to implement the techniques described herein. In some examples, the management device 208 receives instructions over a network from a server to perform the techniques described herein.

The robotic picking assembly 200 may be configured to manipulate various types of items such as items having a wide variety of different characteristics. Such items may include, for example, envelopes, bubble mailers, jiffy padded envelopes, personal electronic devices, computers, recreational equipment, food products, television sets, clothing, household supplies, automotive parts, appliances, books, and any other suitable object capable of being manipulated by the robotic picking assembly 200.

In FIG. 2B, the robotic picking assembly 200 is depicted in use at a first instance 220 while grasping a large and/or heavy item 230, such as a package. The robotic picking assembly 200 may grasp the heavy item 230 using one or more highly damped suction cups that may be part of the end of arm tool coupled to the robotic manipulator 202. Although a number of suction cups are depicted in the example of FIG. 2B, other embodiments may include different numbers of suction cups and/or suction cup assemblies, such as one or more suction cup assemblies. In the first instance 220, the robotic picking assembly 200 may move with high acceleration and/or speed while maintaining a grasp on the heavy item 230.

In contrast, at a second instance 240, if typical suction cups were used with the robotic picking assembly 200, the heavy item may become detached from the suction cups and fall. The highly damped suction cups in the first instance 220 may provide increased damping and may therefore result in improved grip at the same or increased acceleration.

Figure 3:
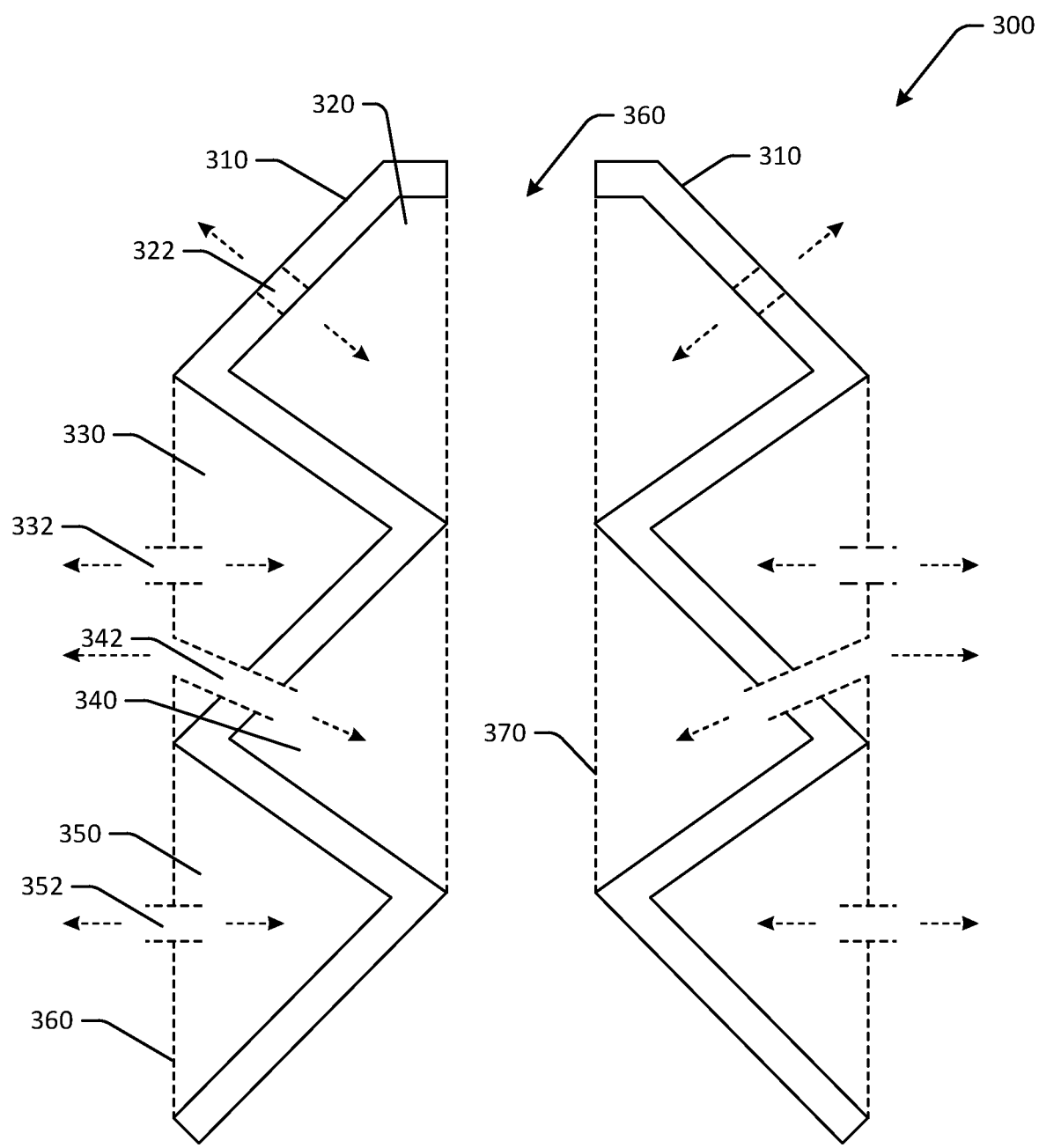
FIG. 3 is a schematic illustration of a highly damped suction cup assembly in accordance with one or more embodiments of the disclosure.

FIG. 3 is a schematic illustration of a highly damped suction cup 300 in accordance with one or more embodiments of the disclosure. Other embodiments may include additional or fewer components. The illustration of FIG. 3 may not be to scale, and may not be illustrated to scale with respect to other figures. The suction cup illustrated in FIG. 3 may be the same suction cup discussed with respect to FIGS. 1-2.

In FIG. 3, the highly damped suction cup 300 may be used with a picking assembly to pick up objects, such as heavy and/or large boxes. Typically, picking up such items may result in use of reduced acceleration to prevent detachment of the item. However, unlike typical picking assemblies, robotic picking assemblies and highly damped suction cups described herein may be used to grasp large and/or heavy items, such as packages, while maintaining typical acceleration and/or movement speed while reducing a risk of detachment due to increased damping of the suction cup.

The highly damped suction cup 300 may be coupled to a vacuum suction system that may provide vacuum flow or negative air pressure to the individual suction cup assemblies. The negative air pressure may flow through the suction cups coupled to the individual suction cup assemblies, which may provide a force that can be used to grasp and lift items out of a container, off of a conveyor, or from another location. To release an item, for example onto a conveyor belt, the negative air pressure may be reduced and/or positive air pressure may be applied.

The highly damped suction cup 300 may have a damping ratio of at least 0.3, which may be greater than typical suction cup damping ratios of about 0.1. Some embodiments of the highly damped suction cup 300 may have damping ratios of up to 1.5, such as about 1.1. The highly damped suction cup 300 may reduce force amplification during movement while grasping an object, thereby decreasing a risk that the object becomes detached from the highly damped suction cup 300.

The highly damped suction cup 300 may include a shell 310 formed of an elastomeric material, such as at least one of: chloroprene, sorbothane, nitrile-butadiene rubber, silicon, neoprene, and so forth. Other embodiments may include different materials and/or combinations of materials. The shell 310 may optionally form one or more bellows, such as a first bellow and a second bellow of the suction cup.

The highly damped suction cup 300 may include a flexible outer surface material 360 disposed between the first bellow and the second bellow. The flexible outer surface material 360 may be an integrated piece of the highly damped suction cup 300, or may be separately coupled to the highly damped suction cup 300. The flexible outer surface material 360 may be formed of the same material as the shell 310 or a different material.

The highly damped suction cup 300 may include a flexible inner surface material 370 that forms a vacuum flow passage 360 along a central axis of the suction cup 300. Although depicted as a symmetrical circular suction cup, other embodiments may have different geometrical configurations, such as oval or square, where the central axis may be defined differently. In addition, vacuum flow may be routed to a side or other non-central portion of the suction cup in some embodiments. The flexible outer surface material 360 and the flexible inner surface material 370 may extend around the circumference of the highly damped suction cup 300 and the vacuum flow passage 360, respectively. The flexible inner surface material 370 and the flexible outer surface material 360 may be configured to deform while grasping an item. The flexible inner surface material 370 and the flexible outer surface material 360 may be formed of the same elastomeric material as the shell 310 in some embodiments, such as chloroprene.

The highly damped suction cup 300 may include a first fluid chamber 320 disposed between the flexible inner surface material 370 and a first portion of the shell 310 that forms the first bellow. The first fluid chamber 320 may provide increased damping and may be configured to retain fluid, such as air, liquid, or other fluids. The highly damped suction cup 300 may include a first aperture 322 formed in the first portion of the shell 310. Fluid from the first fluid chamber 320 may pass through the first aperture 322. As fluid passes through the first aperture 322, a damping effect may be created. The size of the first aperture 322 may be modified depending on the material of the shell 310, the size of the highly damped suction cup 300, the damping fluid used, and/or other factors.

The highly damped suction cup 300 may include a second fluid chamber 330 disposed between the shell 310 and the flexible outer surface material 360. The second fluid chamber 330 may retain the same damping fluid as the first fluid chamber 320 or a different fluid. The highly damped suction cup 300 may include a second aperture 332 formed in the flexible outer surface material 360, where fluid from the second fluid chamber 330 can pass through the second aperture 332. As fluid passes through the second aperture 332, a damping effect may be created. The size of the second aperture 332 may be modified depending on the material of the shell 310, the size of the highly damped suction cup 300, the damping fluid used, and/or other factors.

Some embodiments may include a third fluid chamber 340 disposed between the flexible inner surface material 320 and a second portion of the shell 310 that forms the second bellow. Such embodiments may include a third aperture 342 formed in the second portion of the shell 310, which may be in fluid communication with the second fluid chamber 320. Fluid from the third fluid chamber 340 may therefore pass through the third aperture 342 into the second fluid chamber 330. In some embodiments, the highly damped suction cup 300 may include a fourth aperture formed in the flexible outer surface material 360 adjacent to the second aperture 332, where fluid from the third fluid chamber 340 can pass through the third aperture 332 or the fourth aperture. Some embodiments may include a tunnel that provides direct access between the third fluid chamber 340 and an ambient environment, whereas other embodiments may utilize the second aperture 332 to provide ambient environment access to fluid in both the second fluid chamber 330 and the third fluid chamber 340.

Some embodiments may include a fourth fluid chamber 350 disposed between the shell 310 and the flexible outer surface material 360. The fourth fluid chamber 350 may retain the same damping fluid as the first fluid chamber 320 or a different fluid. The highly damped suction cup 300 may include a fourth (or fifth) aperture 352 formed in the flexible outer surface material 360, where fluid from the fourth fluid chamber 350 can pass through the fourth aperture 352. As fluid passes through the fourth aperture 352, a damping effect may be created. The size of the fourth aperture 352 may be modified depending on the material of the shell 310, the size of the highly damped suction cup 300, the damping fluid used, and/or other factors.

The highly damped suction cup 300 may therefore include a first fluid chamber disposed on an outer portion of the suction cup, such as the second fluid chamber 330, and a first opening, such as aperture 332, where fluid from the first fluid chamber passes through the first opening. The highly damped suction cup 300 may include a second fluid chamber disposed on an inner portion of the suction cup, such as the first fluid chamber 320, and a second opening, such as aperture 322, formed in the shell, where fluid from the second fluid chamber passes through the second opening. The first fluid chamber and the second fluid chamber may therefore be configured to dampen movement of the suction cup. The highly damped suction cup 300 may include the flexible inner surface material 370 and the flexible outer surface material 360, which may be configured to deform while grasping an item using the suction cup.

Relative to traditional suction technology, the highly damped suction cup 300 may provide improved performance in generating an initial seal on a large and/or heavy item, and may allow for increased acceleration and improved performance for maintaining a grasp on such items.

Figure 4:
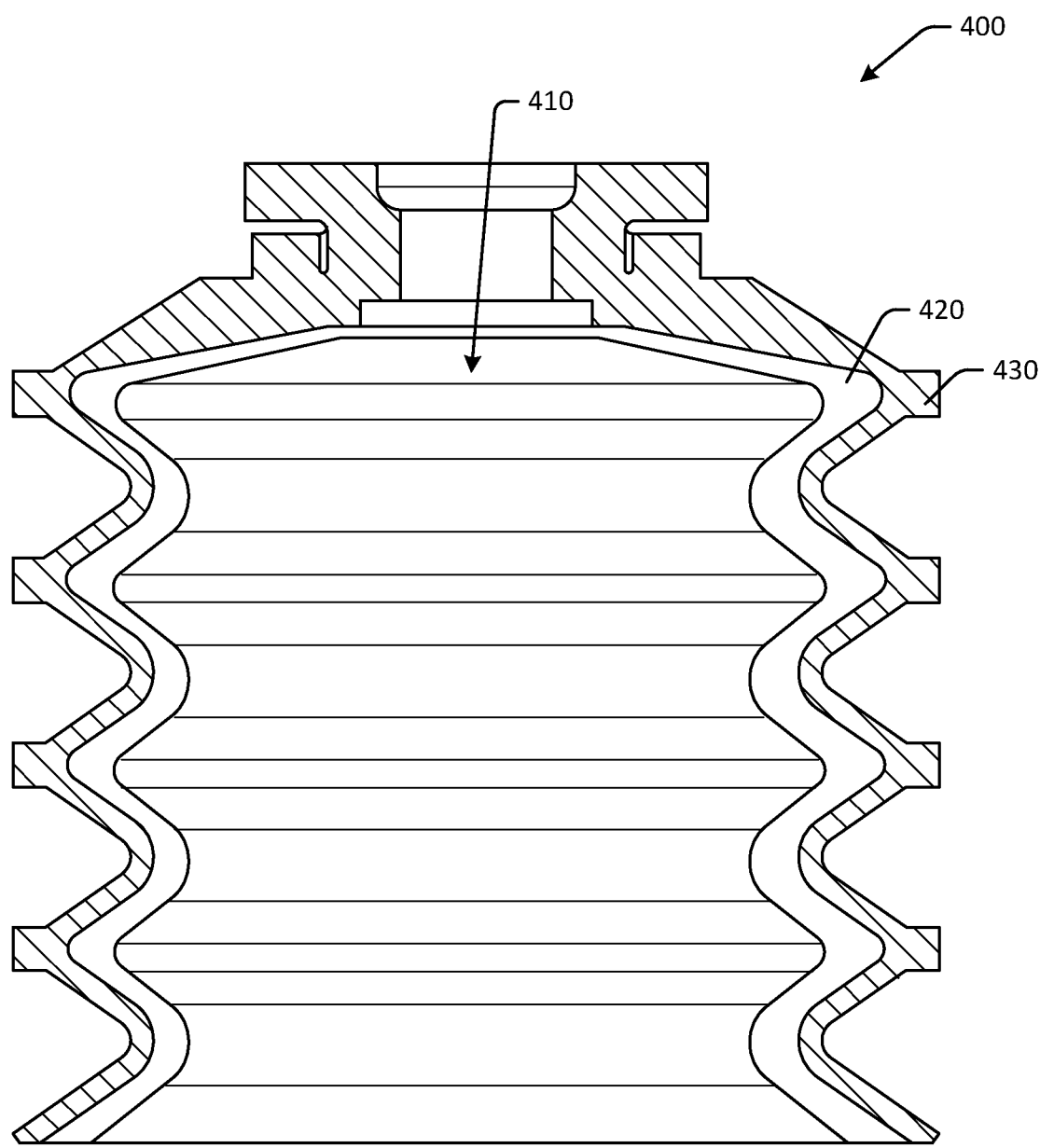
FIG. 4 is a schematic illustration of a highly damped suction cup assembly in accordance with one or more embodiments of the disclosure.

FIG. 4 is a schematic illustration of a highly damped suction cup 400 in accordance with one or more embodiments of the disclosure. Other embodiments may include additional or fewer components. The illustration of FIG. 4 is not to scale, and may not be illustrated to scale with respect to other figures. The components illustrated in FIG. 4 may be components of the suction cups discussed with respect to FIGS. 1-3.

In FIG. 4, the highly damped suction cup 400 may be different from that of FIG. 3 in that instead of using fluid chambers to provide a damping effect and/or increase a damping ratio of the suction cup, the highly damped suction cup 400 may include more than one layer of material that forms the suction cup. The different layers of the suction cup may be formed of different materials. For example, an inner layer of the suction cup may be formed of an elastomeric material, and an outer layer of the suction cup may be formed of chloroprene or another material. In some instances the outer layer may be over-molded or co-molded. Some embodiments may include more than two layers. The suction cup may act as a unitized or integrated suction cup with a damping ratio of 0.3 to about 1.1, depending on the types of materials used, the structure of the suction cup, and so forth. The highly damped suction cup 400 may reduce fatigue and creep during acceleration.

The highly damped suction cup 400 may include a vacuum passage 410 that is formed by an inner layer 420 of a suction cup shell. The suction cup shell may include an outer layer 430 that is disposed over the inner layer 420. The inner layer 420 may be formed of an elastomeric material, such as rubber. The outer layer 430 may be formed of a highly damped material, such as chloroprene, sorbothane, nitrile-butadiene rubber, silicon, neoprene, and the like. The highly damped suction cup 400 may reduce peak load at amplification, allowing for increased acceleration, improved grasp, and ability to grasp heavier items. In other embodiments, the inner layer 420 may be formed of the highly damped material, and the outer layer 430 may be formed of the elastomeric suction cup material. In addition, some embodiments may include more than two layers, with the highly damped material disposed in between two or more adjacent layers.

The highly damped suction cup 400 may be used with a picking assembly, such as part of an end of arm tool. The highly damped suction cup 400 may include an inner shell formed of an elastomeric material, such as the inner layer 420, where the inner shell forms a first bellow and a second bellow. The highly damped suction cup 400 may include an outer shell formed of a highly damped material, such as the outer layer 430, where the outer shell forms the first bellow and the second bellow. The outer shell may be configured to dampen movement of the suction cup. The highly damped suction cup 400 may have a damping ratio of between 0.3 and 1.1. The outer layer 430 may be over-molded on the inner layer 420. Together, the outer shell and the inner shell may form a unitized shell. The outer shell may be configured to deform while grasping an item using the highly damped suction cup 400.

Figure 5:
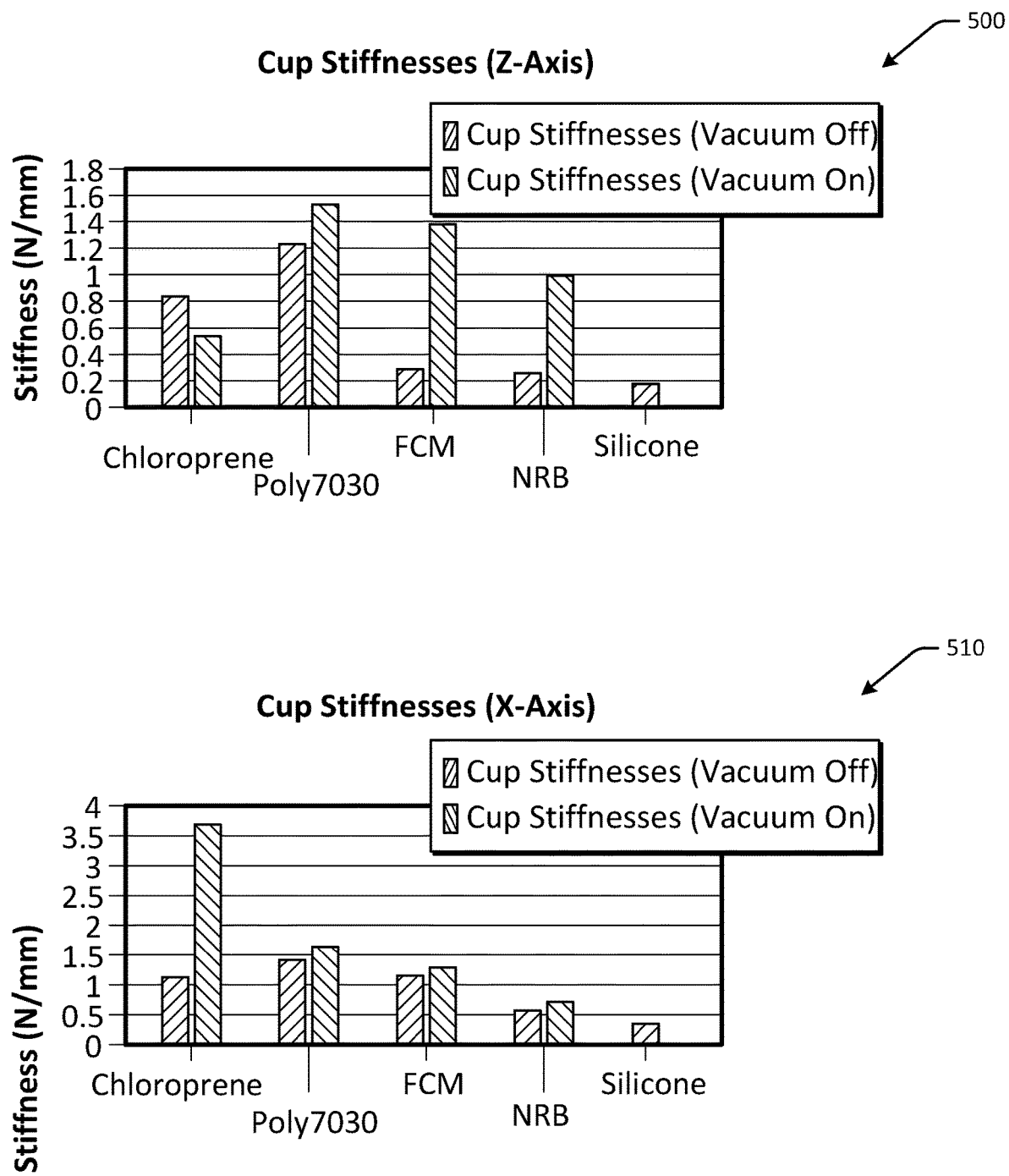
FIG. 5 is a schematic illustration of graphs depicting various measured suction cup stiffness values along a Z-axis and an X-axis in accordance with one or more embodiments of the disclosure.

FIG. 5 is a schematic illustration of graphs depicting various measured suction cup stiffness values along a Z-axis and an X-axis in accordance with one or more embodiments of the disclosure. Although example embodiments of the disclosure may be described in the context of various materials, it should be appreciated that the disclosure is more broadly applicable to additional types of materials.

A first graph 500 depicts measured stiffness values for suction cups along a Z-axis (e.g., a vertical axis depending on orientation of the suction cup). The first graph 500 provides measured stiffness data for both active and inactive vacuum suction. The first graph 500 illustrates values for various materials used to form suction cups. Specifically, measured data for Chloroprene (50 mm, 4 bellows), Poly7030 (50 mm, 4 bellows), FCM (50 mm, 4 bellows), NRB (50 mm, 4 bellows), and Silicone (50 mm, 4 bellows)

is depicted. As illustrated, Poly7030 may have the highest stiffness both with and without vacuum.

A second graph 510 depicts measured stiffness values for suction cups along an X-axis (e.g., a lateral axis depending on orientation of the suction cup). The second graph 510 provides measured stiffness data for both active and inactive vacuum suction. The second graph 510 illustrates values for various materials used to form suction cups. Specifically, measured data for Chloroprene (50 mm, 4 bellows), Poly7030 (50 mm, 4 bellows), FCM (50 mm, 4 bellows), NRB (50 mm, 4 bellows), and Silicone (50 mm, 4 bellows) is depicted. As illustrated, Chloroprene may have the highest stiffness without vacuum, and may also have relatively high stiffness without vacuum.

During acceleration while grasping an item, lateral stiffness may assist in retaining a grasp on the item and reducing force amplification. Increased damping ratios may be used to increase lateral stiffness and reduce force amplification, thereby allowing for improved grasp under acceleration and resulting in increased maximum acceleration with reduced risk of time detachment.

Figure 6A:
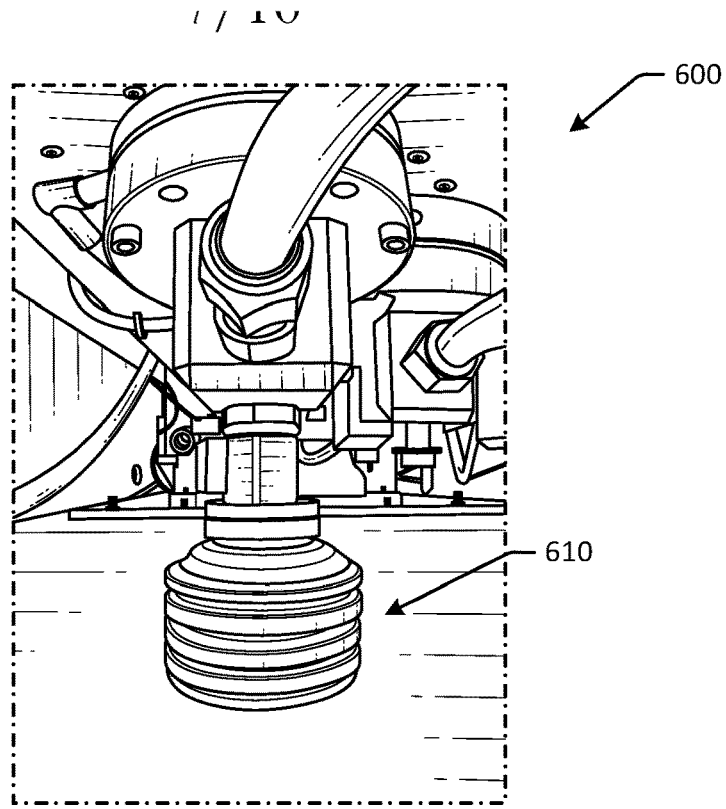
FIGS. 6A-6B are schematic illustrations of suction cup deformation over time for different suction cup assemblies in accordance with one or more embodiments of the disclosure.
Figure 6A:
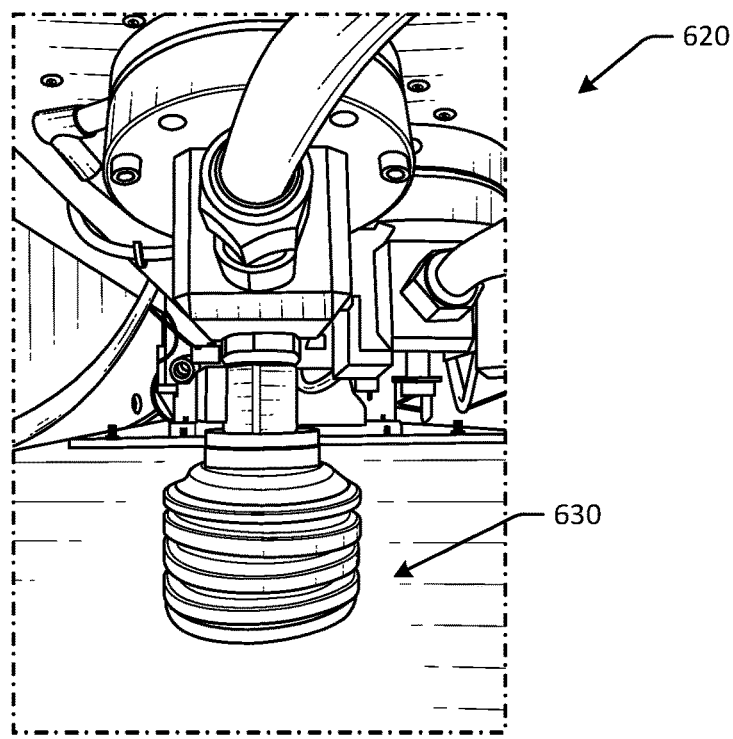
Figure 6B:
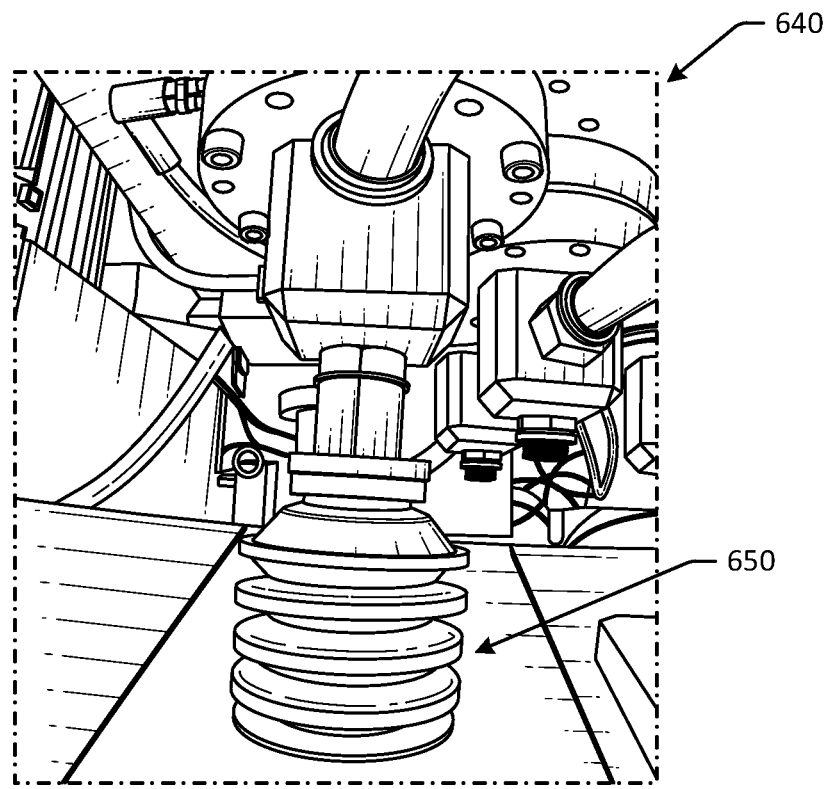
Figure 6B:
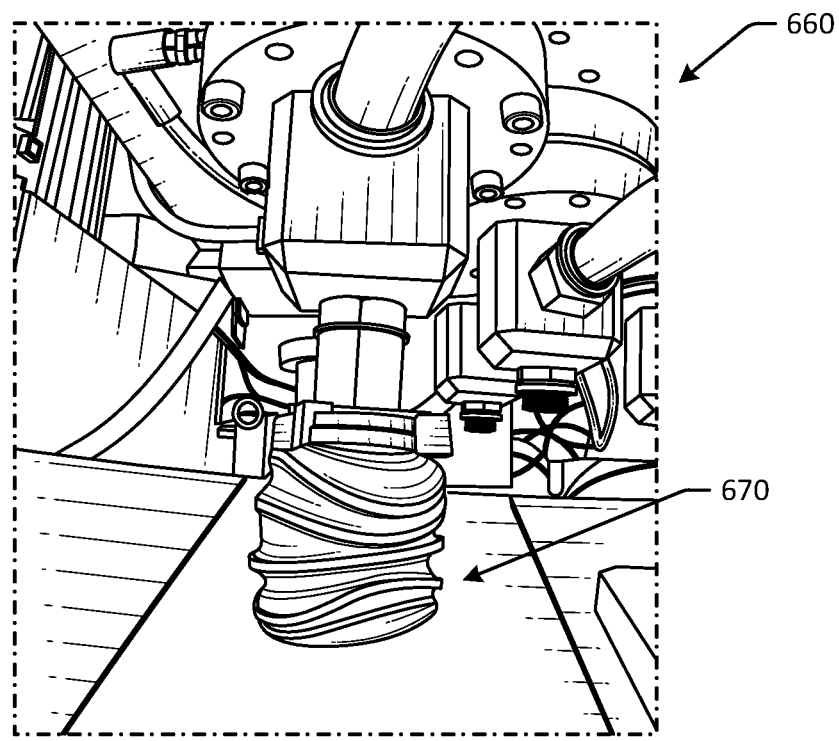

FIGS. 6A-6B are schematic illustrations of suction cup deformation over time for different suction cup assemblies in accordance with one or more embodiments of the disclosure. Other embodiments may include additional or fewer components. The illustrations of FIGS. 6A-6B are not to scale, and may not be illustrated to scale with respect to other figures. The components illustrated in FIGS. 6A-6B may be components of the picking assemblies and/or suction cup assemblies discussed with respect to FIGS. 1-5.

In FIG. 6A, two different suction cup assemblies are depicted. At a first instance 600, a highly damped suction cup 610 as described herein is used to grasp a heavy item. At a second instance 620, a typical suction cup 630 is used to grasp the same heavy item. Initial grasp on the item may be similar. However, as depicted in FIG. 6B, at a third instance 640, the highly damped suction cup may maintain a grasp 650 on the heavy item during acceleration, whereas at a fourth instance 660, under the same acceleration the typical suction cup 670 may deform and lose grasp on the item. Depending on the grasp of other suction cups of the assembly, the deformation may result in detachment of the heavy item from the suction cup assembly. In contrast, the highly damped suction cups may retain a grasp on the heavy item.

Figure 7:
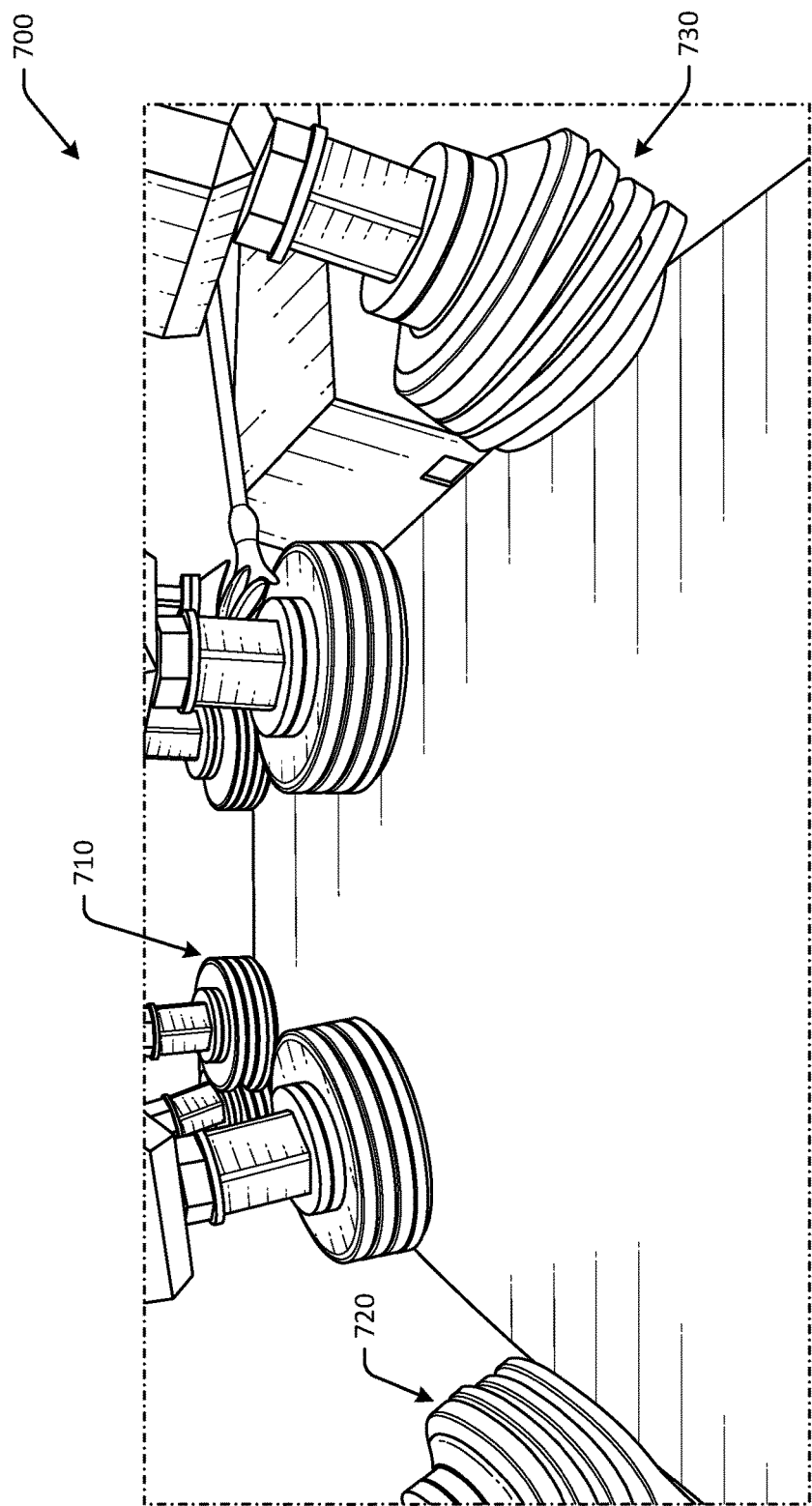
FIG. 7 is a schematic illustration of a suction cup assembly grasping a large item during high acceleration in accordance with one or more embodiments of the disclosure.

FIG. 7 is a schematic illustration of a suction cup assembly grasping a large item 700 during high acceleration in accordance with one or more embodiments of the disclosure. Other embodiments may include additional or fewer components. The illustration of FIG. 7 is not to scale, and may not be illustrated to scale with respect to other figures. Any of the configurations illustrated in FIG. 7 may be used with the picking assemblies discussed with respect to FIGS. 1-6B.

In FIG. 7, the suction cup assembly may include a number of suction cups, such as a first suction cup 710, a second suction cup 720, a third suction cup 730, and so forth. Other embodiments may include a different number of suction cups. The suction cup assembly may retain a grasp on heavy items during acceleration that may not otherwise be possible due to damping and reduction of force amplification. Due to the damping effect of the suction cups, the third suction cup 730, for instance, may retain a grasp on the item, whereas a typical suction cup may disengage.

The individual suction cups may include a shell formed of an elastomeric material. The shell may form a number of bellows, such as a first bellow and a second bellow. The suction cup may include a first fluid chamber disposed on an outer portion of the suction cup, and a first opening, where fluid from the first fluid chamber passes through the first opening. The suction cup may include a second fluid chamber disposed on an inner portion of the suction cup, and a second opening formed in the shell, where fluid from the second fluid chamber passes through the second opening. The first fluid chamber and the second fluid chamber together may be configured to dampen movement of the suction cup. The first opening and the second opening may be in fluid communication with an ambient environment. The suction cup may include a flexible outer surface material extending between the first bellow and the second bellow, and a flexible inner surface material that forms a vacuum flow passage along a central axis of the suction cup. In some embodiments, the first opening is formed in the flexible outer surface material.

Some embodiments of the suction cup may include an optional third fluid chamber disposed on the inner portion of the suction cup, and a third opening formed in the shell, where fluid from the third fluid chamber passes through the third opening. Fluid from the third fluid chamber may also pass through the third opening into the first fluid chamber.

The flexible inner surface material and the flexible outer surface material may be configured to deform while grasping an item using the suction cup. The flexible inner surface material and the flexible outer surface material may be formed of the elastomeric material. In some embodiments, the elastomeric material may be, or may include, chloroprene. In other embodiments, the elastomeric material may be at least one of: chloroprene, sorbothane, nitrile-butadiene rubber, silicon, or neoprene. The flexible inner surface material and the flexible outer surface material may optionally be integrated with the shell of the suction cup. The suction cup has a damping ratio of between 0.3 and 1.1.

One or more operations of the methods, process flows, or use cases of FIGS. 1-7 may have been described above as being performed by a user device, or more specifically, by one or more program module(s), applications, or the like executing on a device. It should be appreciated, however, that any of the operations of the methods, process flows, or use cases of FIGS. 1-7 may be performed, at least in part, in a distributed manner by one or more other devices, or more specifically, by one or more program module(s), applications, or the like executing on such devices. In addition, it should be appreciated that processing performed in response to the execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-7 may be described in the context of the illustrative devices, it should be appreciated that such operations may be implemented in connection with numerous other device configurations.

The operations described and depicted in the illustrative methods, process flows, and use cases of FIGS. 1-7 may be carried out or performed in any suitable order, such as the depicted orders, as desired in various example embodiments of the disclosure. Additionally, in certain example embodiments, at least a portion of the operations may be carried out in parallel. Furthermore, in certain example embodiments, less, more, or different operations than those depicted in FIGS. 1-7 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by the execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Illustrative Computer Architecture

Figure 8:
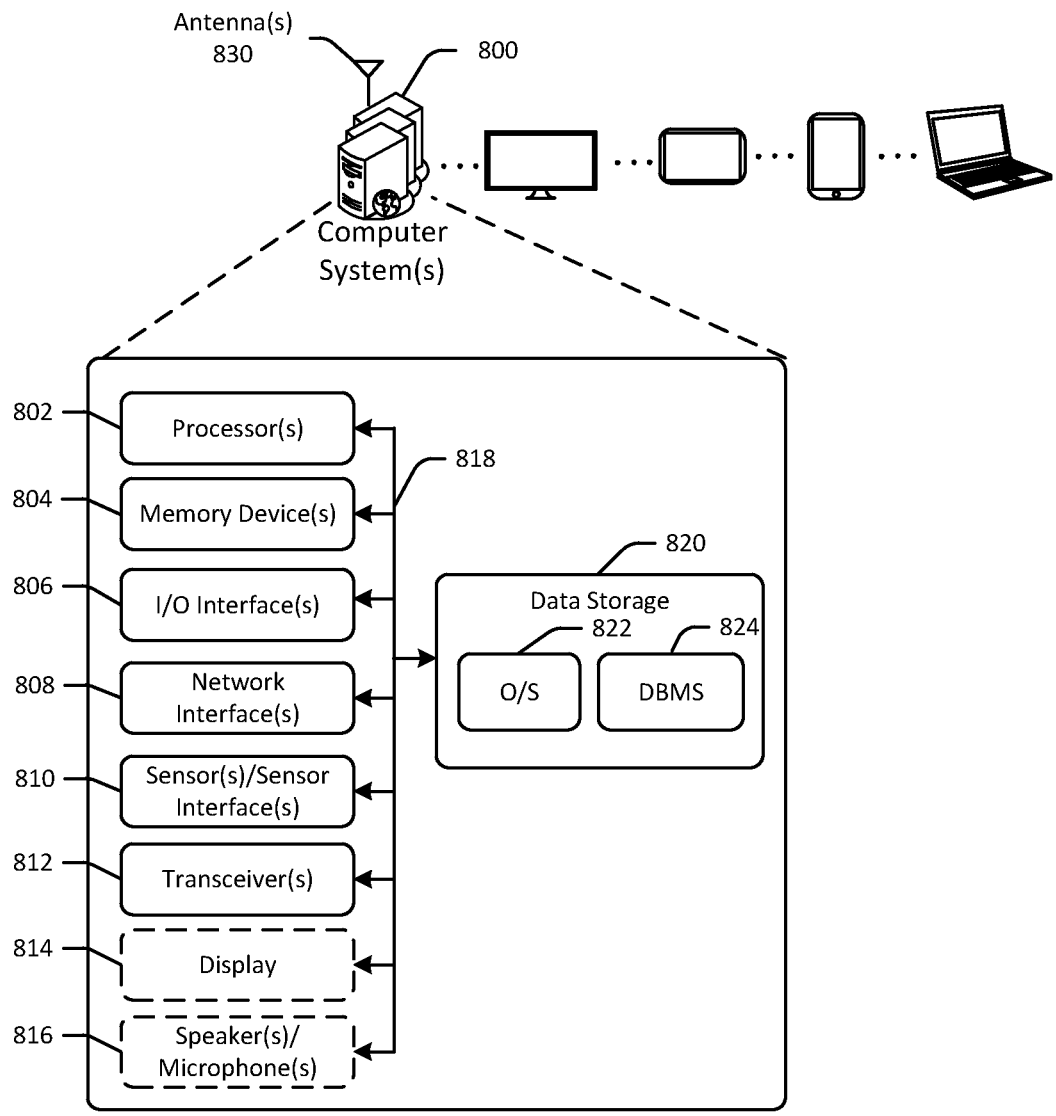
FIG. 8 schematically illustrates an example architecture of a controller associated with an item picking system in accordance with one or more embodiments of the disclosure.

FIG. 8 is a schematic block diagram of one or more illustrative controller(s) or computer system(s) 800 in accordance with one or more example embodiments of the disclosure. The computer system(s) 800 may include any suitable computing device including, but not limited to, a server system, a voice interaction device, a mobile device such as a smartphone, a tablet, an e-reader, a wearable device, or the like; a desktop computer; a laptop computer; a content streaming device; or the like. The computer system(s) 800 may correspond to an illustrative device configuration for the controller(s) discussed with respect to any one of FIGS. 1-7. For example, the computer system(s) 800 may control one or more aspects of the robotic picking assemblies with highly damped suction cups described in FIGS. 1-7, such as determining which suction cup assemblies to grasp an item with, control flow rates, determine which suction cup assemblies are to be provided positive or negative air pressure, determine where a robotic arm or other device is to position a picking assembly, determine acceleration values at which to move suction cup assemblies, and so forth.

The computer system(s) 800 may be configured to communicate with one or more servers, user devices, cameras, or the like. The computer system(s) 800 may be configured to identify items, retrieve items, move items, and so forth.

The computer system(s) 800 may be configured to communicate via one or more networks. Such network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the computer system(s) 800 may include one or more processors (processor(s)) 802, one or more memory devices 804 (also referred to herein as memory 804), one or more input/output (I/O) interface(s) 806, one or more network interface(s) 808, one or more sensor(s) or sensor interface(s) 810, one or more transceiver(s) 812, one or more optional display(s) 814, one or more optional microphone(s) 816, and data storage 820. The computer system(s) 800 may further include one or more bus(es) 818 that functionally couple various components of the computer system(s) 800. The computer system(s) 800 may further include one or more antenna(s) 830 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 818 may include at least one of a system bus, a memory bus, an address bus, or a message bus, and may permit the exchange of information (e.g., data (including computer-executable code), signaling, etc.) between various components of the computer system(s) 800. The bus(es) 818 may include, without limitation, a memory bus or a memory controller, a peripheral bus, an accelerated graphics port, and so forth. The bus(es) 818 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnect (PCI) architecture, a PCI-Express architecture, a Personal Computer Memory Card International Association (PCMCIA) architecture, a Universal Serial Bus (USB) architecture, and so forth.

The memory 804 of the computer system(s) 800 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 804 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 804 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 820 may include removable storage and/or non-removable storage including, but not limited to, magnetic storage, optical disk storage, and/or tape storage. The data storage 820 may provide non-volatile storage of computer-executable instructions and other data. The memory 804 and the data storage 820, removable and/or non-removable, are examples of computer-readable storage media (CRSM) as that term is used herein.

The data storage 820 may store computer-executable code, instructions, or the like that may be loadable into the memory 804 and executable by the processor(s) 802 to cause the processor(s) 802 to perform or initiate various operations. The data storage 820 may additionally store data that may be copied to the memory 804 for use by the processor(s) 802 during the execution of the computer-executable instructions. Moreover, output data generated as a result of execution of the computer-executable instructions by the processor(s) 802 may be stored initially in the memory 804, and may ultimately be copied to the data storage 820 for non-volatile storage.

More specifically, the data storage 820 may store one or more operating systems (O/S) 822; one or more database management systems (DBMS) 824; and one or more program module(s), applications, engines, computer-executable code, scripts, or the like. Some or all of these module(s) may be sub-module(s). Any of the components depicted as being stored in the data storage 820 may include any combination of software, firmware, and/or hardware. The software and/or firmware may include computer-executable code, instructions, or the like that may be loaded into the memory 804 for execution by one or more of the processor(s) 802. Any of the components depicted as being stored in the data storage 820 may support functionality described in reference to corresponding components named earlier in this disclosure.

The data storage 820 may further store various types of data utilized by the components of the computer system(s) 800. Any data stored in the data storage 820 may be loaded into the memory 804 for use by the processor(s) 802 in executing computer-executable code. In addition, any data depicted as being stored in the data storage 820 may potentially be stored in one or more datastore(s) and may be accessed via the DBMS 824 and loaded in the memory 804 for use by the processor(s) 802 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like.

The processor(s) 802 may be configured to access the memory 804 and execute the computer-executable instructions loaded therein. For example, the processor(s) 802 may be configured to execute the computer-executable instructions of the various program module(s), applications, engines, or the like of the computer system(s) 800 to cause or facilitate various operations to be performed in accordance with one or more embodiments of the disclosure. The processor(s) 802 may include any suitable processing unit capable of accepting data as input, processing the input data in accordance with stored computer-executable instructions, and generating output data. The processor(s) 802 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 802 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 802 may be capable of supporting any of a variety of instruction sets.

Referring now to other illustrative components depicted as being stored in the data storage 820, the O/S 822 may be loaded from the data storage 820 into the memory 804 and may provide an interface between other application software executing on the computer system(s) 800 and the hardware resources of the computer system(s) 800. More specifically, the O/S 822 may include a set of computer-executable instructions for managing the hardware resources of the computer system(s) 800 and for providing common services to other application programs (e.g., managing memory allocation among various application programs). In certain example embodiments, the O/S 822 may control execution of the other program module(s). The O/S 822 may include any operating system now known or which may be developed in the future including, but not limited to, any server operating system, any mainframe operating system, or any other proprietary or non-proprietary operating system.

The DBMS 824 may be loaded into the memory 804 and may support functionality for accessing, retrieving, storing, and/or manipulating data stored in the memory 804 and/or data stored in the data storage 820. The DBMS 824 may use any of a variety of database models (e.g., relational model, object model, etc.) and may support any of a variety of query languages. The DBMS 824 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the computer system(s) 800 is a mobile device, the DBMS 824 may be any suitable lightweight DBMS optimized for performance on a mobile device.

Referring now to other illustrative components of the computer system(s) 800, the input/output (I/O) interface(s) 806 may facilitate the receipt of input information by the computer system(s) 800 from one or more I/O devices as well as the output of information from the computer system(s) 800 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the computer system(s) 800 or may be separate. The I/O devices may further include, for example, any number of peripheral devices such as data storage devices, printing devices, and so forth.

The I/O interface(s) 806 may also include an interface for an external peripheral device connection such as universal serial bus (USB), FireWire, Thunderbolt, Ethernet port or other connection protocol that may connect to one or more networks. The I/O interface(s) 806 may also include a connection to one or more of the antenna(s) 830 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, a ZigBee network, etc.

The computer system(s) 800 may further include one or more network interface(s) 808 via which the computer system(s) 800 may communicate with any of a variety of other systems, platforms, networks, devices, and so forth. The network interface(s) 808 may enable communication, for example, with one or more wireless routers, one or more host servers, one or more web servers, and the like via one or more networks.

The antenna(s) 830 may include any suitable type of antenna depending, for example, on the communications protocols used to transmit or receive signals via the antenna(s) 830. Non-limiting examples of suitable antennas may include directional antennas, non-directional antennas, dipole antennas, folded dipole antennas, patch antennas, multiple-input multiple-output (MIMO) antennas, or the like. The antenna(s) 830 may be communicatively coupled to one or more transceivers 812 or radio components to which or from which signals may be transmitted or received.

As previously described, the antenna(s) 830 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(s) 830 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11 ad). In alternative example embodiments, the antenna(s) 830 may be configured to transmit or receive radio frequency signals within any suitable frequency range forming part of the unlicensed portion of the radio spectrum.

The antenna(s) 830 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 812 may include any suitable radio component(s) for—in cooperation with the antenna(s) 830—transmitting or receiving radio frequency (RF) signals in the bandwidth and/or channels corresponding to the communications protocols utilized by the computer system(s) 800 to communicate with other devices. The transceiver(s) 812 may include hardware, software, and/or firmware for modulating, transmitting, or receiving—potentially in cooperation with any of antenna(s) 830—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 812 may further include hardware, firmware, or software for receiving GNSS signals. The transceiver(s) 812 may include any known receiver and baseband suitable for communicating via the communications protocols utilized by the computer system(s) 800. The transceiver(s) 812 may further include a low noise amplifier (LNA), additional signal amplifiers, an analog-to-digital (A/D) converter, one or more buffers, a digital baseband, or the like.

The sensor(s)/sensor interface(s) 810 may include or may be capable of interfacing with any suitable type of sensing device such as, for example, inertial sensors, force sensors, thermal sensors, photocells, and so forth. Example types of inertial sensors may include accelerometers (e.g., MEMS-based accelerometers), gyroscopes, and so forth.

The optional display(s) 814 may be configured to output light and/or render content. The optional speaker(s)/microphone(s) 816 may be any device configured to receive analog sound input or voice data.

It should be appreciated that the program module(s), applications, computer-executable instructions, code, or the like depicted in FIG. 8 as being stored in the data storage 820 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the computer system(s) 800, and/or hosted on other computing device(s) accessible via one or more networks, may be provided to support functionality provided by the program module(s), applications, or computer-executable code depicted in FIG. 8 and/or additional or alternate functionality. Further, functionality may be modularized differently such that processing described as being supported collectively by the collection of program module(s) depicted in FIG. 8 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 8 may be implemented, at least partially, in hardware and/or firmware across any number of devices.

It should further be appreciated that the computer system(s) 800 may include alternate and/or additional hardware, software, or firmware components beyond those described or depicted without departing from the scope of the disclosure. More particularly, it should be appreciated that software, firmware, or hardware components depicted as forming part of the computer system(s) 800 are merely illustrative and that some components may not be present or additional components may be provided in various embodiments. While various illustrative program module(s) have been depicted and described as software module(s) stored in the data storage 820, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A robotic picking assembly comprising:
a robotic manipulator;
a vacuum suction system configured to provide negative air pressure; and
a picking assembly coupled to the robotic manipulator and the vacuum suction system, the picking assembly configured to pick up and release individual items, the picking assembly comprising:
a suction cup comprising:
a shell formed of an elastomeric material, wherein the shell forms a first bellow and a second bellow of the suction cup;
a flexible outer surface material disposed between the first bellow and the second bellow;
a flexible inner surface material that forms a vacuum flow passage along a central axis of the suction cup;
a first fluid chamber disposed between the flexible inner surface material and a first portion of the shell that forms the first bellow;
a first aperture formed in the first portion of the shell, wherein fluid from the first fluid chamber can pass through the first aperture;
a second fluid chamber disposed between the shell and the flexible outer surface material; and
a second aperture formed in the flexible outer surface material, wherein fluid from the second fluid chamber can pass through the second aperture;
wherein the flexible inner surface material and the flexible outer surface material are configured to deform while grasping an item.

2. The robotic picking assembly of claim 1, wherein the suction cup further comprises:
a third fluid chamber disposed between the flexible inner surface material and a second portion of the shell that forms the second bellow;
a third aperture formed in the second portion of the shell, wherein fluid from the third fluid chamber can pass through the third aperture into the second fluid chamber; and
a fourth aperture formed in the flexible outer surface material adjacent to the second aperture, wherein fluid from the third fluid chamber can pass through the third aperture or the fourth aperture.

3. The robotic picking assembly of claim 1, wherein the flexible inner surface material and the flexible outer surface material are formed of the elastomeric material, and wherein the elastomeric material comprises chloroprene.

4. The robotic picking assembly of claim 1, wherein the suction cup has a damping ratio of at least 0.3.

5. A suction cup for a picking assembly, the suction cup comprising:
a shell formed of an elastomeric material, wherein the shell forms a first bellow;
a first fluid chamber disposed on an outer portion of the suction cup;
a second fluid chamber disposed on an inner portion of the suction cup;
a first opening, wherein fluid from the first fluid chamber passes through the first opening; and
a second opening formed in the shell, wherein fluid from the second fluid chamber passes through the second opening;
wherein the first fluid chamber is configured to dampen movement of the suction cup, and the second fluid chamber is configured to dampen movement of the suction cup.

6. The suction cup of claim 5, wherein the shell further forms a second bellow, the suction cup further comprising:
a flexible outer surface material extending between the first bellow and the second bellow; and
a flexible inner surface material that forms a vacuum flow passage along a central axis of the suction cup;
wherein the first opening is formed in the flexible outer surface material.

7. The suction cup of claim 6, wherein the flexible inner surface material and the flexible outer surface material are formed of the elastomeric material.

8. The suction cup of claim 6, wherein the flexible inner surface material and the flexible outer surface material are integrated with the shell of the suction cup.

9. The suction cup of claim 5, further comprising:
a third fluid chamber disposed on the inner portion of the suction cup; and
a third opening formed in the shell, wherein fluid from the third fluid chamber passes through the third opening.

10. The suction cup of claim 9, wherein fluid from the third fluid chamber passes through the third opening into the first fluid chamber.

11. The suction cup of claim 5, wherein the suction cup has a damping ratio of between 0.3 and 1.1.

12. The suction cup of claim 5, wherein the first opening and the second opening are in fluid communication with an ambient environment.

13. The suction cup of claim 5, wherein the fluid is air.

14. The suction cup of claim 5, wherein the elastomeric material comprises at least one of: chloroprene, sorbothane, nitrile-butadiene rubber, silicone, or neoprene.

15. A suction cup for a picking assembly, the suction cup comprising:
a first shell layer formed of an elastomeric material, wherein the first shell layer forms a first bellow and a second bellow;
a first opening formed in the first shell layer;
a second shell layer that forms the first bellow and the second bellow; and
a second opening formed in the second shell layer, wherein the first opening and the second opening are in fluid communication with an ambient environment;
wherein the first shell layer is configured to dampen movement of the suction cup, and wherein the suction cup has a damping ratio of between 0.3 and 1.1.

16. The suction cup of claim 15, wherein the highly damped material comprises at least one of: chloroprene, sorbothane, nitrile-butadiene rubber, silicon, or neoprene.

17. The suction cup of claim 15, wherein the second shell layer is over-molded on the first shell layer.

18. The suction cup of claim 15, wherein the first shell layer is over-molded on the second shell layer.

19. The suction cup of claim 15, wherein the second shell layer is configured to deform while grasping an item using the suction cup.

\* \* \* \* \*